United States Patent
Spencer et al.

(10) Patent No.: US 7,526,753 B2
(45) Date of Patent: Apr. 28, 2009

(54) SYSTEM AND METHOD FOR CREATING, MANAGING AND USING CODE SEGMENTS

(75) Inventors: Sam Spencer, Redmond, WA (US); Matthew W. Gertz, Woodinville, WA (US); Ting Liang, Redmond, WA (US); James R. Schmelzer, Seattle, WA (US); Amanda K. Silver, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 355 days.

(21) Appl. No.: 10/464,397

(22) Filed: Jun. 18, 2003

(65) Prior Publication Data
US 2004/0261059 A1    Dec. 23, 2004

(51) Int. Cl.
    G06F 9/44    (2006.01)

(52) U.S. Cl. ...................................... 717/109

(58) Field of Classification Search ......... 717/100–103, 717/104–109, 118, 139; 719/315, 319; 709/203, 709/226, 227, 246, 229; 707/101, 200, 103 R, 707/1–2, 104.1; 715/513, 762
See application file for complete search history.

(56) References Cited

U.S. PATENT DOCUMENTS

| | | | |
|---|---|---|---|
| 6,427,228 B1 * | 7/2002 | Wigger ....................... 717/111 |
| 6,427,230 B1 * | 7/2002 | Goiffon et al. ............... 717/108 |
| 6,675,370 B1 * | 1/2004 | Sundaresan ................. 717/106 |
| 6,920,474 B2 * | 7/2005 | Walsh et al. ................ 709/200 |
| 6,941,510 B1 * | 9/2005 | Ozzie et al. ................. 715/513 |
| 6,957,416 B2 * | 10/2005 | Adams ....................... 717/107 |
| 6,981,212 B1 * | 12/2005 | Claussen et al. ............. 715/513 |
| 7,058,886 B1 * | 6/2006 | Sulistio et al. .............. 715/517 |
| 7,275,207 B2 * | 9/2007 | Aureglia et al. ............. 715/214 |
| 2002/0046294 A1 * | 4/2002 | Brodsky et al. ............. 709/246 |
| 2002/0049788 A1 * | 4/2002 | Lipkin et al. ................ 707/513 |
| 2002/0049790 A1 * | 4/2002 | Ricker et al. ................ 707/513 |
| 2003/0056195 A1 | 3/2003 | Hunt .......................... 717/116 |
| 2003/0070159 A1 * | 4/2003 | Webb ......................... 717/116 |
| 2003/0084425 A1 * | 5/2003 | Glaser ........................ 717/110 |
| 2003/0221184 A1 * | 11/2003 | Gunjal et al. ............... 717/118 |

(Continued)

FOREIGN PATENT DOCUMENTS

EP    0 817 032 A2    1/1998

(Continued)

OTHER PUBLICATIONS

Cho, Y.S. et al., "A Model for Software Reuse", *Journal of Systems Integration*, 1996, 6(3), 181-201.

(Continued)

*Primary Examiner*—Tuan Anh Vu
(74) *Attorney, Agent, or Firm*—Woodcock Washburn LLP

(57) ABSTRACT

A code segment and elements of information (e.g., meta information) associated with the code segment are encoded in an XML file. One or more encoded code segments are saved within a library of encoded code segments. An encoded code segment may be selected and inserted into a source code file. When the encoded code is inserted into the source code, associated elements required by the code segment are automatically included and the portions of the code segments that may require modification are identified. The code segments are managed and organized so that sharing of code segments is facilitated.

28 Claims, 16 Drawing Sheets

U.S. PATENT DOCUMENTS

2004/0187090 A1* 9/2004 Meacham .................. 717/103

FOREIGN PATENT DOCUMENTS

GB        2 359 157 A     8/2001
WO     WO 03/005243 A1   1/2003

OTHER PUBLICATIONS

Polster, F.J., et al., "Reuse of Software through Generation of Partial Systems", *IEEE Transactions on Software Engineering*, 1986, SE-12(3), 402-416.

Yin, W., et al., "Software Reusability: A Survey and a Reusability Experiment", *Proceedings 1987 Fall Joint Computer Conference-Exploring Technology: Today and Tomorrow*, 1987, 65-72.

Rothenberger, M.A. et al., "A Software Reuse Measure: Monitoring and Enterprise-Level Model Driven Development Process", *Information & Management*, 1999, 35, 283-293.

Gamma, E. et al., "Design Patterns: Elements of Reusable Object-Oriented Software Passage", *Design Patterns. Elements of Reusable Object-Oriented Software*, 1995, 1-9, 207-217, XP-002200550.

* cited by examiner

```xml
<?xml version="1.0" encoding="utf-8" ?>
<codesegment format="1.0.0">
    <header>
```
402a `<title>` | SendMail | `</title>` 402b     404

406

408a `<uniqueid>` | {E44FC889-4561-494b-A66D-BA9984C4C49A} | `</uniqueid>`

408b

```xml
<?xml version="1.0" encoding="utf-8" ?>
<codesegment format="1.0.0">
    <header>
        <title>SendMail</title>
        <uniqueid>{E44FC889-4561-494b-A66D-BA9984C4C49A}</uniqueid>
        <version>1.0.0.1</version>
        <locale>en-us</locale>
        <author>Mort@YourBank.com</author>
        <decsription>
            This code snippet uses the System.Web.Mail namespace to send mail using SMTP.
        </decsription>
        <helpurl>http://mort01/snippets</helpurl>
        <category>Internet/Email</category>
        <keywords>Email; SMTP</keywords>
    </header>
    <snippet>
        <platform>
            <runtime>1.0.1.1</runtime>
        </platform>
        <references>
            <reference>
                <assembly>System.Web.dll</assembly>
                <version>1.0.3300.0</version>
            </reference>
            <reference>
                <assembly>mscorlib.dll</assembly>
                <version>1.0.3705.0</version>
            </reference>
            <reference>
                <assembly>simplemapi.dll</assembly>
                <version>1.0.0.34</version>
                <url>http://www.geocities.net/nutz/boltz/mail/simplemail.dll </url>
            </reference>
        </references>
        <declarations>
            <control>
                <id>TextBox1</id>
                <type>System.Windows.Forms.TextBox</type>
            </control>
            <object>
                <id>Addresses</id>
                <type>System.ArrayList</type>
            </object>
```

```
<literal>
        <id>sender</id>
        <tooltip>The email address of the sender</tooltip>
</literal>
<literal>
        <id>recipient</id>
        <type>System.String</type>
        <tooltip>The email address of the recipient</tooltip>
</literal>
<literal>
        <id>subject</id>
        <type>System.String</type>
        <tooltip>The string for the subject line</tooltip>
</literal>
<literal>
        <id>body</id>
        <type>System.String</type>
        <tooltip>The body of the message</tooltip>
</literal>
<literal>
        <id>format</id>
        <type>System.Web.Mail.MailFormat</type>
        <tooltip>The format of the message, (HTML or Text)</tooltip>
</literal>
</declarations>
```

```
</code language="Visual Basic" scope="method">
        Try
                ' Create a new message
                Dim Message As New System.Web.Mail.MailMessage()
                ' Set the message property_ul15 ?ettings
                With Message
                        .From = <literal id="sender">"you@address.com"</literal>
                        .To = <literal id="recipient">"you@address.com"</literal>
                        .Subject = <literal id="subject">"your subject"</literal>
                        .Body = <literal id="body">"The body for your mail message"</literal>
                        .BodyFormat = <literal id="format">MailFormat.Html</literal>
                End With 'Send the Message via the SmtpMail shared function
                System.Web.Mail.SmtpMail.Send(Message)
        Catch ex As Exception
                MsgBox("Oops, I did it again: " + ex.Message)
        End Try </code>
```

410

```
</snippet>
</codesegment>
```

```xml
<?xml version="1.0" encoding="utf-8"?>
<codesegment format="1.0.0">
    <header>
        <title>SendMail Example</title>
        <uniqueid>f02d06e0-d521-4311-b3b6-7db0d4a9f48b</uniqueid>
        <version>1.0.0.1</version>
        <locale>en-us</locale>
        <author>Mort@YourBank.com</author>
        <description>This code snippet uses the System.Web.Mail namespace to send mail using SMTP.</description>
        <helpurl>http://mort01/snippets</helpurl>
        <category>Internet/Email</category>
        <keywords>Email; SMTP</keywords>
    </header>
    <snippet>
        <platform>
            <runtime>v1.2.30613</runtime>
        </platform>
        <imports>
            <import>
                <namespace>System.Web.Mail</namespace>
            </import>
        </imports>
        <references>
            <reference>
                <assembly>System.Web</assembly>
                <version>1.2.30613.0</version>
                <url />
            </reference>
        </references>
        <declarations>
            <literal>
                <id>sender</id>
                <type/>
                <tooltip>Sender's name</tooltip>
            </literal>
            <literal>
                <id>recipient</id>
                <type/>
                <tooltip>Recipient's name</tooltip>
            </literal>
```

FIG. 13a

```
<literal>
                        <id>sender</id>
                        <type/>
                        <tooltip>Sender's name</tooltip>
        </literal>
        <literal>
                        <id>recipient</id>
                        <type/>
                        <tooltip>Recipient's name</tooltip>
        </literal>
        <object>
                        <id>from_address</id>
                        <type>System.String</type>
                        <tooltip>Type or select sender's e-mail
address here.</tooltip>
        </object>
        <object>
                        <id>to_address</id>
                        <type>System.String</type>
                        <tooltip>Type or select recipient's e-mail
address here.</tooltip>
        </object>
        <literal>
                        <id>greet</id>
                        <type/>
                        <tooltip>Put a greeting word here.</tooltip>
        </literal>
        <literal>
                        <id>body</id>
                        <type/>
                        <tooltip>Type the message text here</tooltip>
        </literal>
        <literal>
                        <id>format</id>
                        <type/>
                        <tooltip>Select the format of the e-mail. Usually
MailFormat.HTML</tooltip>
        </literal>
```

FIG. 13b

```
</declarations>
        <code language="VB" scope="method decl">
            Public Sub SendGreetingMail(ByVal <literal id="sender">SenderName</literal> As String, ByVal <literal id="recipient">RecipientName</literal> As String)
                Try
                    ' Create a new message
                    Dim Message As New MailMessage()

' Set the message property's settings
                    With Message
                        From = <object id="from_address">"name@domain.com"</object>
                        To = <object id="to_address">"name@domain.com"</object>
                        Subject = "<literal id="greet">Greeting</literal> From " + <literal id="sender">SenderName</literal> + "!"
                        .Body = "<literal id="body">The body for your mail message</literal>"
                        BodyFormat = <literal id="format">MailFormat.HTML</literal>
                    End With ' Send the Message via the SmtpMail shared function
                    SmtpMail.Send(Message)
                Catch ex As Exception
                    MsgBox("Error delivering message from " + <literal id="sender">SenderName</literal> + " to " + <literal id="recipient">RecipientName</literal> + ". (Exception: " + ex.Message + ")")
                End Try
            End Sub
        </code>
    </snippet>
</codesegment>
```

FIG. 13c

SYSTEM AND METHOD FOR CREATING, MANAGING AND USING CODE SEGMENTS

FIELD OF THE INVENTION

The invention relates to programming tools and, in particular, to a way to create, manage and use code segments.

BACKGROUND OF THE INVENTION

As the need for software solutions burgeons, it becomes more and more important to increase programmer efficiency. One way to increase programmer efficiency is to rouse segments of code that have already been written. Traditionally, this has been done manually: the user finds and saves a code segment and modifies it for use in its new environment. Although this is a help, in some cases, it can be difficult to find the particular code segment a developer needs, and once found, modifying the code segment so that it complies with the intended use can be a significant task.

It would be helpful if there were a way to make code segments easier to find and modify and to make the solution the code segment provides more robust.

SUMMARY OF THE INVENTION

A code segment and elements of information (e.g., meta information) associated with the code segment may be encoded together, in an XML file, or in another type of file or database. One or more encoded code segments are persisted as a library of encoded code segments. The repository of the library may be a filesystem or database. An encoded code segment may be selected, possibly using a search operation, and inserted into a source code file. When the encoded code is inserted into the source code, associated elements required by the code segment are automatically included and the portions of the code segments that may require modification are identified. The code segments are managed and organized so that sharing of code segments is facilitated. Tools are provided by which new code segments can be created and added to the library for later use.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 4a-b depict an exemplary encoded code segment in accordance with one aspect of the invention;

FIGS. 13a-c depict an exemplary encoded code segment in accordance with the aspect of the invention illustrated in FIG. 12.

DETAILED DESCRIPTION OF ILLUSTRATIVE EMBODIMENTS

Overview

A code segment and elements of information associated with the code segment (e.g., meta information associated with the code segment such as required references) are encoded in a file or files. In one embodiment of the invention, the code segment and meta information are encoded within an XML file. One or more encoded code segments are saved within a library of encoded code segments. A segment from the library may be selected and inserted into a source code file. When the segment is inserted into the source code, associated elements required by the code segment may be automatically included. Portions of the code segment that may require modification are identified and a means for easily navigating through the modifiable elements is provided. Tips for modifying the code segment may be displayed. Comments concerning the code segment may also be displayed. In addition, validation of the correct insertion of the code segment may be performed. Preferably, the code segments are managed and organized so that sharing of code segments is facilitated.

Exemplary Computing Environment

Figure 1:
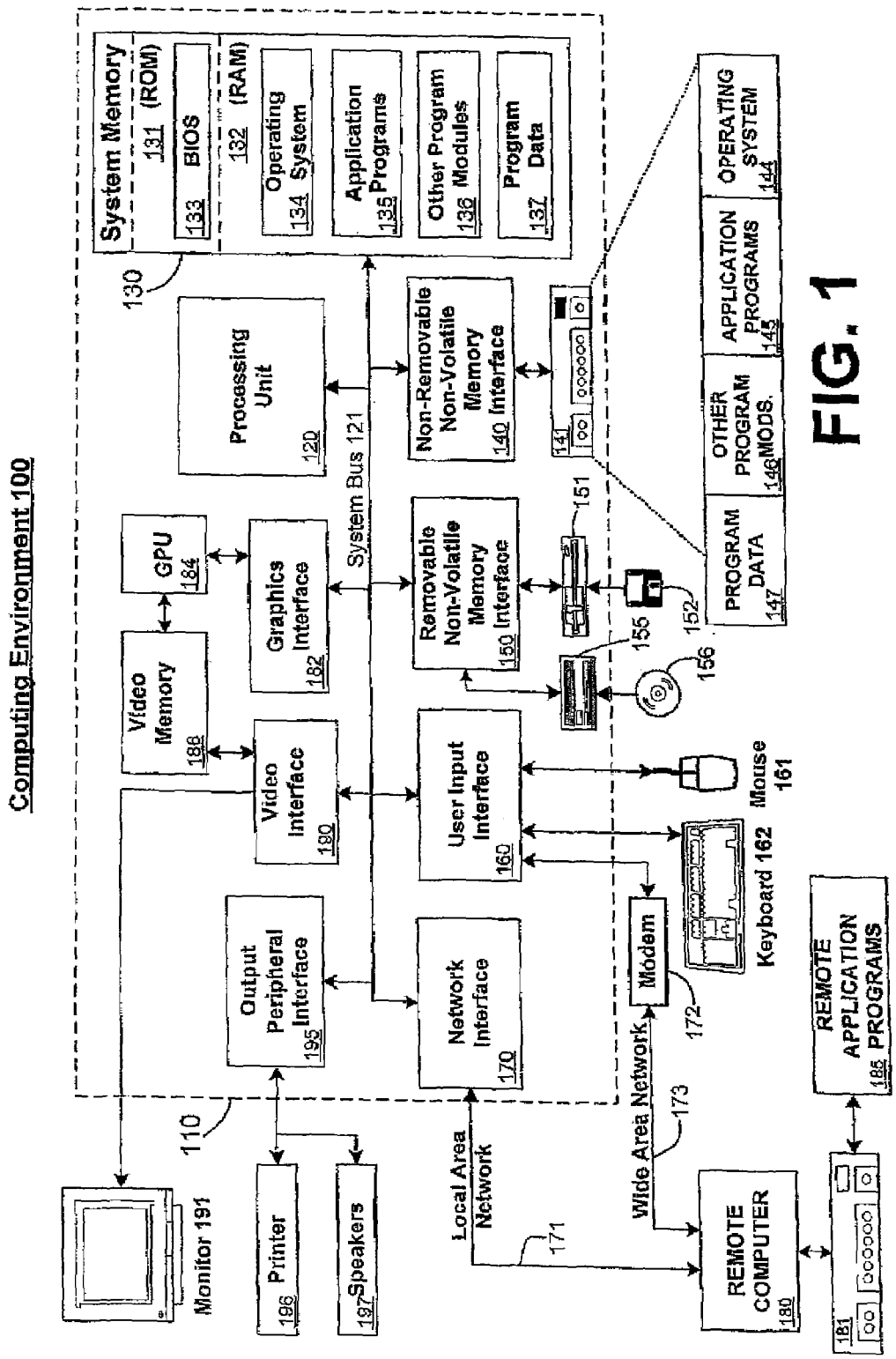
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1a illustrates operating system 134, application programs 135, other program modules 136, and program data 137.

The computer 110 may also include other removable/non-removable, volatile/nonvolatile computer storage media. By way of example only, FIG. 1a illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/no-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1a. The logical connections depicted in FIG. 1a include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1a illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

System and Method for Creating, Managing and using Code Segments

Figure 2:
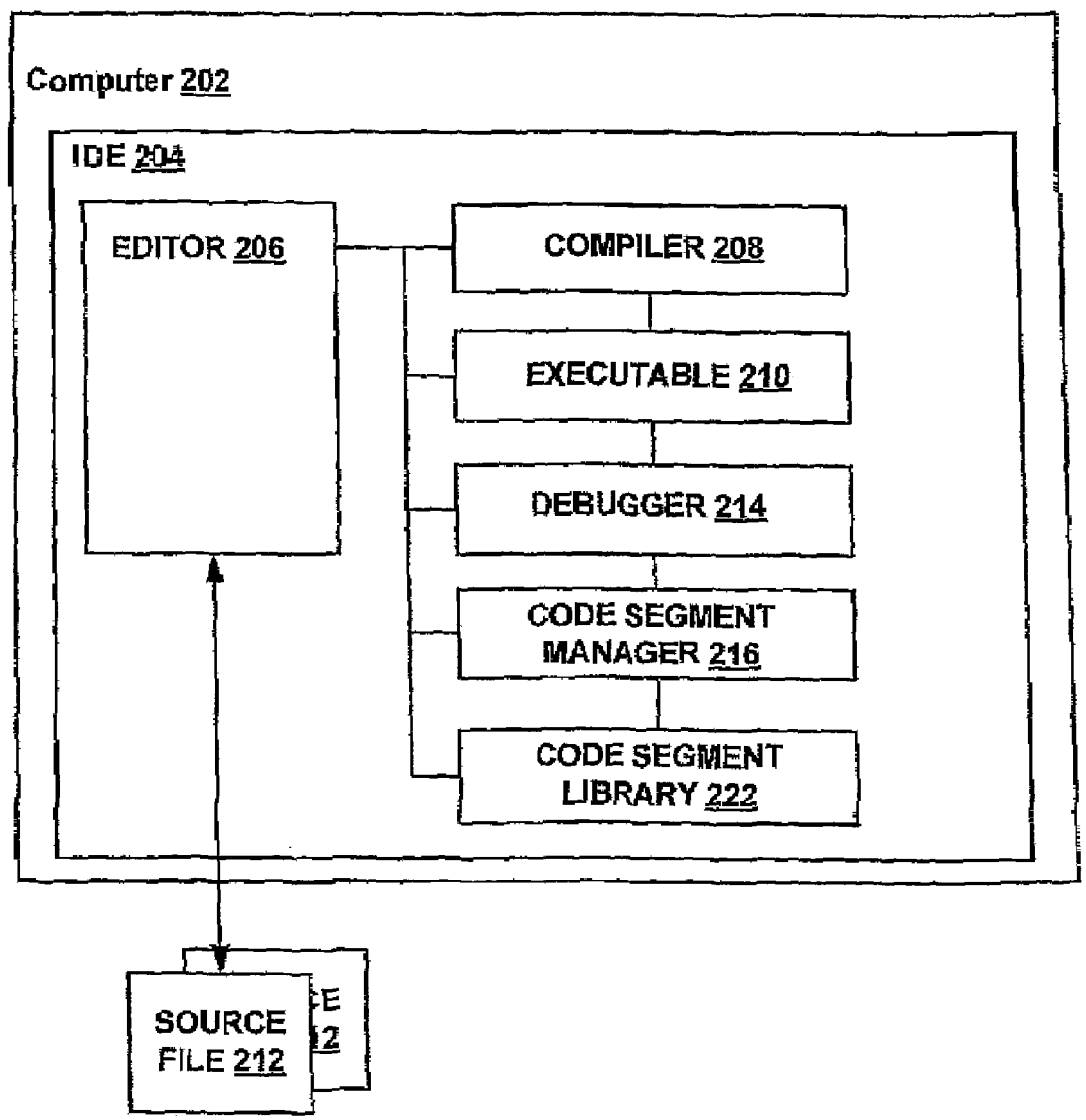
FIG. 2 is an exemplary block diagram of a system for creating, managing and re-using code segments in accordance with one embodiment of the invention.

FIG. 2 is a block diagram of a system for creating, managing and using code segments in accordance with one embodiment of the invention. In FIG. 2 computer 202 represents a computer such as but not limited to a user or development computer on which the invention may reside. The invention may be implemented as a component of an integrated design environment or as a stand-alone system. The tool may include a code segment manager 216, and one or more of the following: a code segment library 222, one or more language debuggers, here represented by debugger 214, one or more language services (not shown), one or more editors represented by editor 206 for drafting and editing source code 212 and one or more compilers, represented by compiler 208. Those of ordinary skill in the art will appreciate that the design environment IDE 204 may also include other components, not shown in FIG. 2.

Source code file 212 typically is a set of instructions that a programmer or developer types or edits, and is written in a given programming language or combination of programming languages. Source code 212 typically comprises one or more statements, each statement typically comprising one or more expressions and/or entities. The expression and/or entities in the statement can be made up of multiple components. Source code 212 may be created or modified by editor 206 and may be persisted onto a stable storage medium.

Applications may be created from source code 212 using the design environment (e.g., exemplary integrated design environment (IDE) 204). The design environment may include one or more compilers, here represented by compiler 208, one or more language services (not shown), one or more design tools (represented herein by debugger 214, one or more editors, here represented by editor 206, browsers (not shown), and the like. IDE 204 may represent, for example, MICROSOFT VISUAL STUDIO .NET, or DREAMWEAVER by MACROMEDIA or BORLAND C++ BUILDER STUDIO 6 or any other software development/design tool, compiler or environment.

A design environment such as IDE 204 may generate from source code 212 executable code 210 capable of being run in a stand-alone execution environment (not shown) or may generate an intermediate form of code that is interpreted or compiled again and run by an execution environment. Such an execution environment may include elements required in order to run the compilation produced by the design environment IDE 204 from the source code 212. The execution environment may include elements that produce native code from a non-device specific intermediate language code. The development and execution environments may in addition include various class libraries (not shown). A suitable execution environment may, for example, represent MICROSOFT COMMON LANGUAGE RUNTIME .NET or JAVA or any other suitable execution environment. The application executable may be loaded, along with shared class libraries and the execution environment onto one or more computers (not shown) and run.

Editor 206 facilitates the development of source code 212 of a computer program. Editor 206 may be a BASIC, COBOL, FORTRAN, C, C++, a C#, JAVA, J#, VISUAL BASIC, REAL BASIC, DELPHI, ASP, PASCAL, HTML, XML, ADA, PERL, DYLAN, PYTHON, SMALLTALK, TCL-TK, EIFFEL editor, or the like.

Compiler 208 may represent a BASIC, COBOL, FORTRAN, C, C++, C#, JAVA, J#, VISUAL BASIC, REAL BASIC, DELPHI, ASP, PASCAL, HTML, XML, ADA, PERL, DYLAN, PYTHON, SMALLTALK, TCL-TK, EIFFEL compiler or interpreter or any other suitable compiler or interpreter.

In one embodiment of the invention, a code segment is received by code segment manager 216, converted into a file, such as an XML file and saved in a code segment library 222.

Code segments in code segment library 222 may then be available for insertion in source code as described more fully below.

Figure 3:
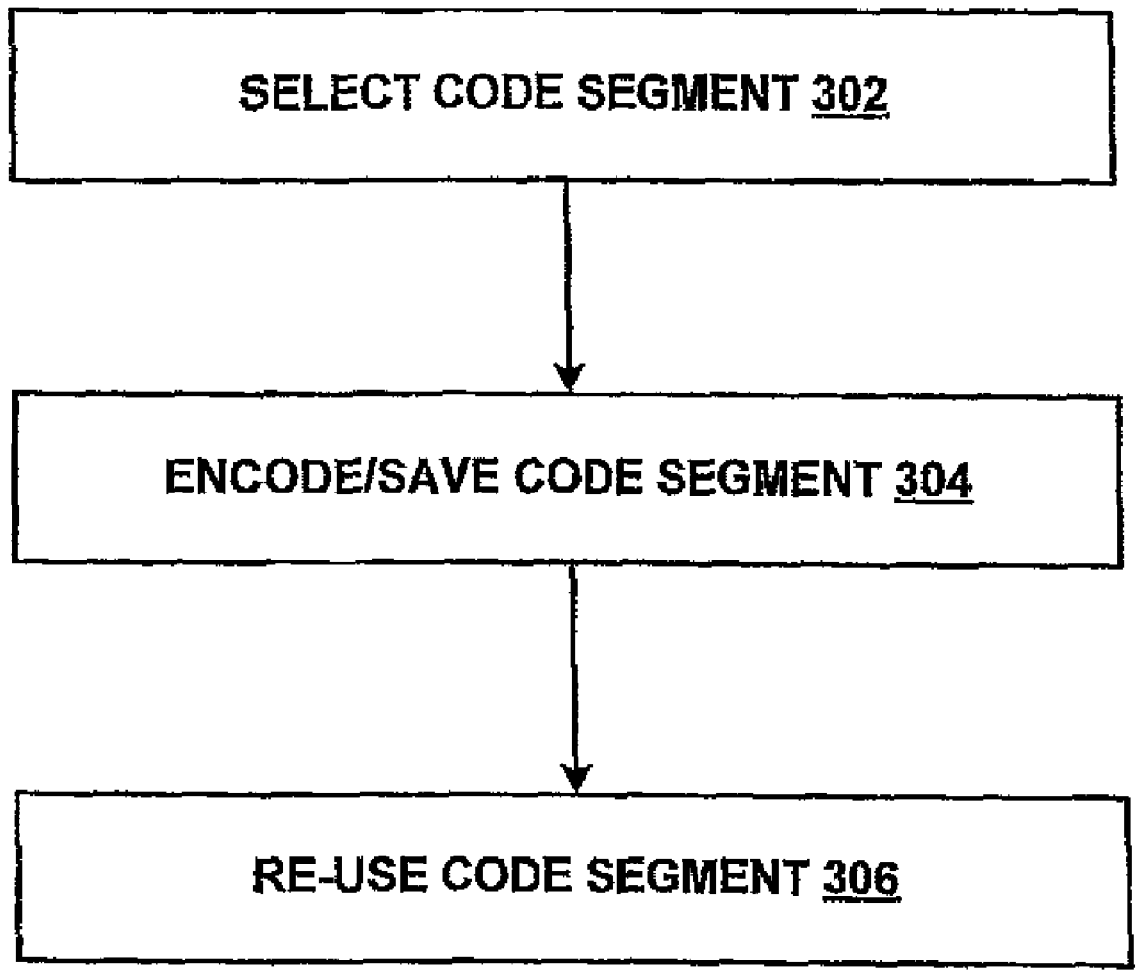
FIG. 3 is a flow diagram of a process for creating, managing and reusing code segments in accordance with one embodiment of the invention.

FIG. 3 is a flow diagram of a process for creating, storing and reusing code segments in accordance with one embodiment of the invention. Referring now to FIG. 3, in step 302, to generate a code segment for saving and re-use, a section of code within a source program may be selected (e.g., by highlighting a section of code and right-clicking or by any other suitable means). In one embodiment of the invention, upon selection of a block of code for inclusion in the code segment library 222, a new session of a program editor user interface is displayed. At this point, in one embodiment of the invention, the creator of the code segment may be able to edit the code segment, set a default value for one or more selected elements or portions of the code segment, define a selection as a modifiable object, variable or literal or the like, and provide help text for modifying that portion of the code segment if it is selected for re-use. The type of the expected modification may also be specified. (As a non-limiting example, an object, variable or literal may be of type integer, string or class.) A template of types may be associated with the modifiable element. For example, if a code segment interacts with a data source, the code segment may be associated with a database schema and strongly-typed objects to which the schema refers. In addition, a title for the code segment, and keywords to search on to find the code segment may be provided, tips for modifying the code segment if it is selected for re-use and/or comments may be specified for selected elements in the code segment. Meta information about the segment that can be inferred from its original use in the source program is presented. It and any additional meta information required by the user may be associated with the code segment.

Figure 5:
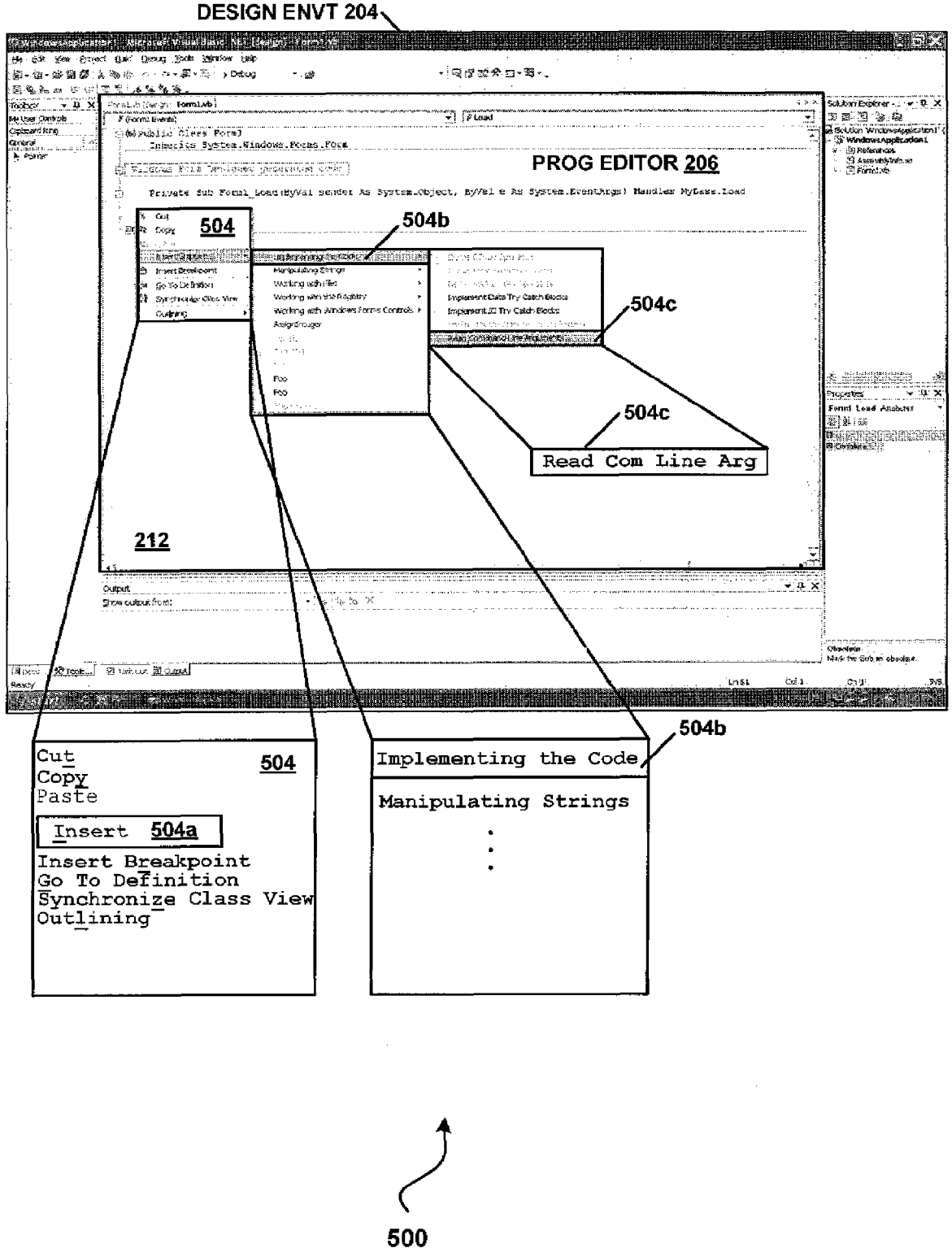
FIG. 5 is an exemplary screen shot of a user interface for selecting a code segment to insert into a source program in accordance with one embodiment of the invention.

The code segment in one embodiment of the invention is converted to an XML file in step 304. An exemplary XML file 400 that may be created from a code segment is illustrated in FIG. 4. Library 222 in one embodiment of the invention is a collection of objects for re-use and includes one or more encoded code segments such as illustrative encoded code segment 400. Encoded code segment 400 may include one or more of the following: the title 404 of the code segment, indicated by beginning and ending tags 402*a* and 402*b* ("<title>"), a unique identifier 406 indicated by beginning tag "<uniqueid>" 408*a* and ending tag "<uniqueid>" 408*b*, and so on including items such as version of code segment, the code segment's locale, the author of the code segment, a description of what the code segment does, a universal resource locator (URL) to a help topic for the code segment, one or more categories to which the code segment belongs (e.g., such as), keywords which can be used to find the code segment, a version of execution environment on which the code segment is intended to run, references such as libraries and assemblies needed by the code segment to run, declarations of controls, objects, literals and the like in the code segment, the programming language the code segment is coded in, the actual code in the code segment 410 and other information as desired. It will be understood that in an XML file, these portions of the code segment may be delimited by any suitable begin and end tags, and that the specific tags selected as delimiters referred to above are exemplary only. Any suitable tags or indicators may be used to identify the information persisted. It will also be understood that while in one embodiment of the invention, the file is an XML file and the meta information is encoded in the XML file, in another embodiment the information may be encoded in one or more files or databases that are not XML files At step 306 a developer or other user may access encoded code segments such as encoded code segment 400 of library 222 for the purpose of re-using the code. In one embodiment of the invention, encoded code segments of code segment library 222 may be accessed from within the development environment for re-use in a new environment. FIG. 5 illustrates an exemplary screen shot 500 of one embodiment of the invention, in which a program editor user interface is displayed, and wherein a context menu 504 displays as one possible option "Insert Snippet" 504*a* (shortened to "INSERT" in FIG. 5). Upon selection of "Insert Snippet" 504*a*, a list of actions of which "IMPLEMENT CODE" 504*b* is one and possible encoded code segments of which "Read Command Line Arguments" (shortened to "READ COM LINE ARGS" 504*c*) is displayed. Upon selection of the encoded code segment 504*c*, the code portion of the selected encoded code segment is inserted into the program source code 212. Code segments that would not be correctly inserted in the particular location denoted for insertion may be grayed out or otherwise prohibited from selection.

Figure 6:
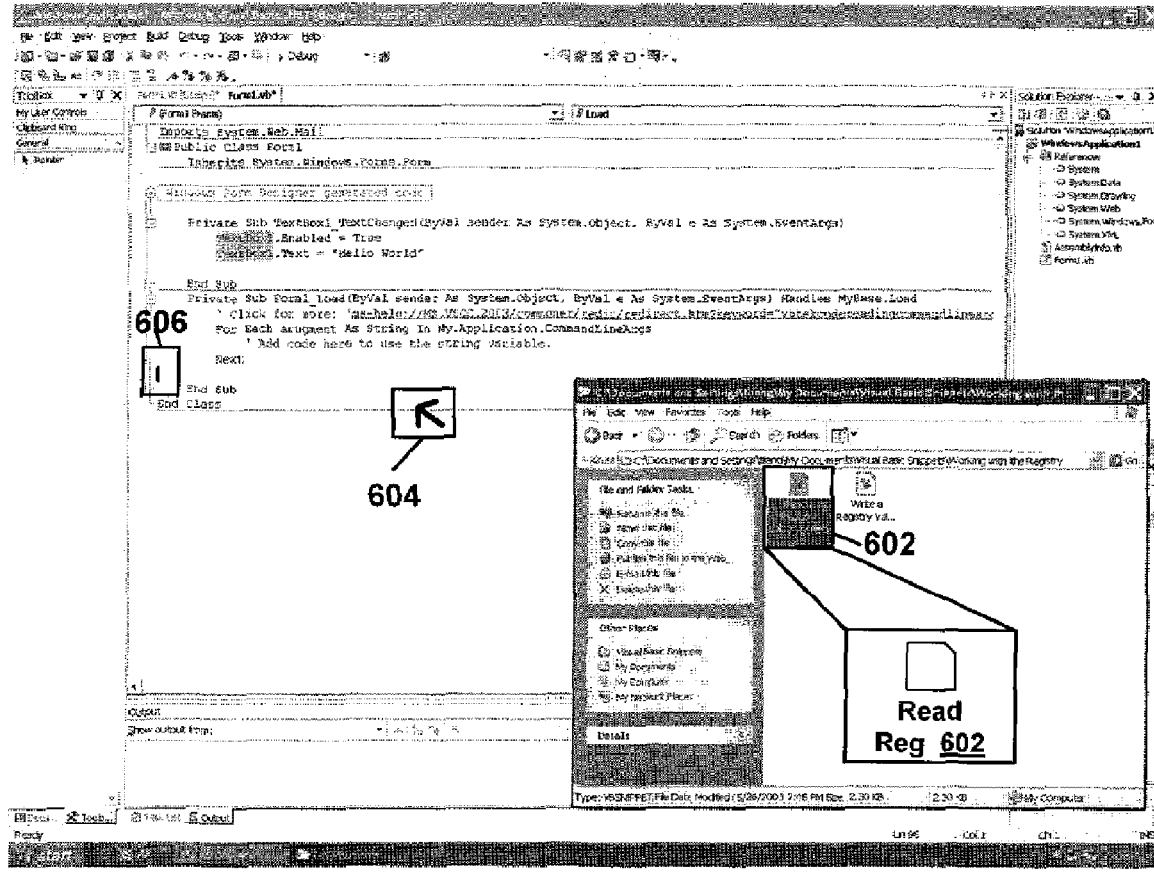
FIG. 6 is an exemplary screen shot of another user interface for selecting a code segment to insert into a source program in accordance with one embodiment of the invention.

In one embodiment of the invention, a developer or other user may access code segment library members such as encoded code segment 400 of library 222 for the purpose of re-using code by bringing up a display of the contents of a drive or directory and selecting and dragging the encoded code segment from the drive or directory contents display, (i.e., the library) as shown in exemplary screen shot 600 of FIG. 6, in which encoded code segment 602 has been so selected. In other embodiments, the code segment may be selected by any commonly known means of selecting text for use in an editor. Cursor 604 representing the location where the selected code segment will be inserted is also designated by a vertical bar 606. Vertical bar 606 in one embodiment only is displayed if the location selected for insertion of the code segment is an allowable location for insertion.

Figure 7:
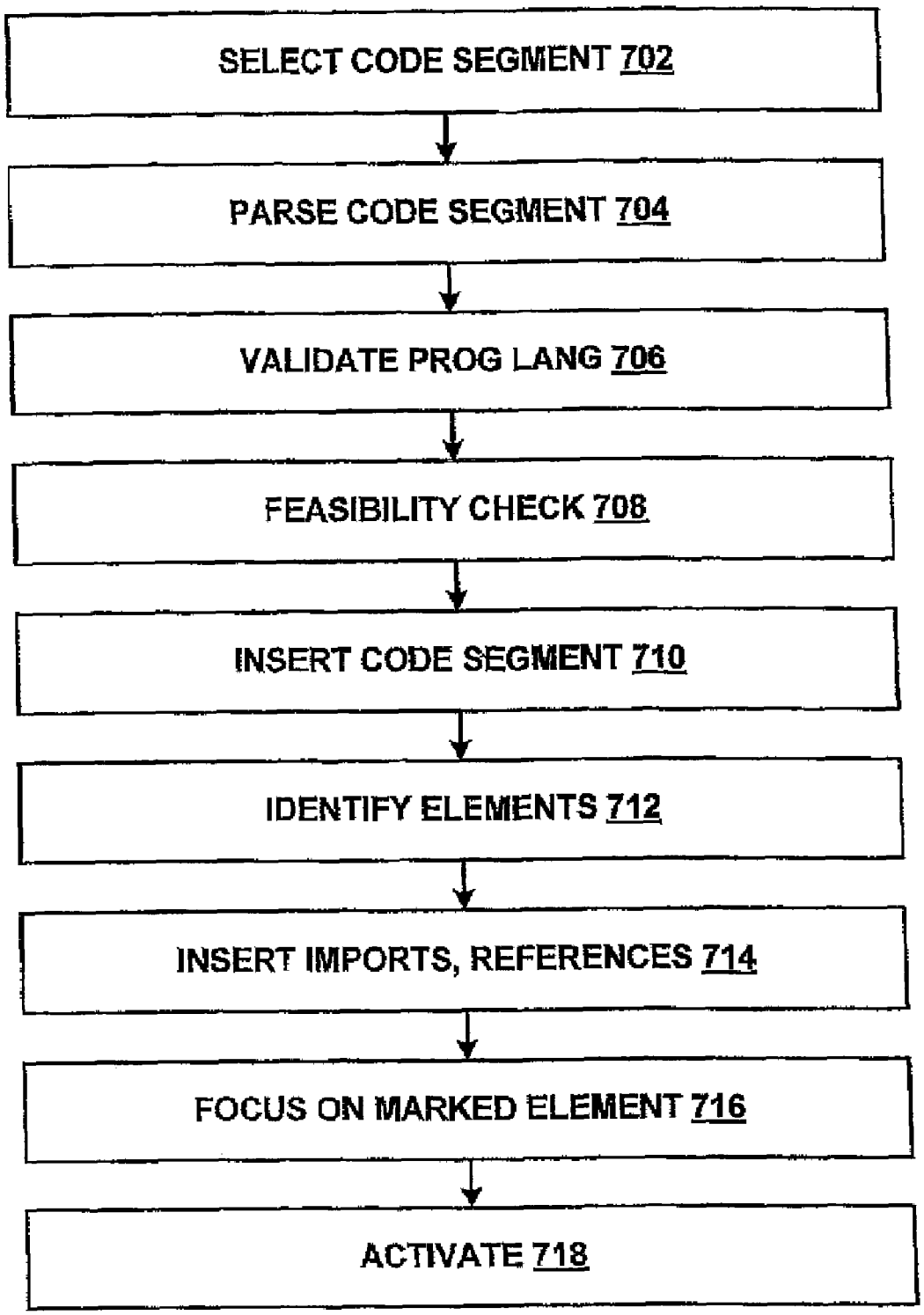
FIG. 7 is a flow diagram of a process for inserting a code segment into a source program in accordance with one aspect of the invention.

FIG. 7 is a process for inserting a code segment into source code in accordance with one aspect of the invention. In step 702, a code segment is selected for insertion into the source code. FIGS. 5 and 6 show two ways of selecting a code segment for insertion, although, as explained above, other ways of selecting code segments are contemplated.

At step 704, the encoded code segment is parsed to determine the meta information available. In one embodiment, in which the code segment is encoded as an XML file, the XML code is parsed to determine the meta information elements delimited by the XML tags, as described above.

At step 706 the programming language in the code segment meta information is compared to the source code programming language. If the programming languages are incompatible, the insertion of the code segment may not be allowed. (For example, if the code segment selected for insertion is a C++ code segment, the source code into which the code segment is inserted must be C++ code.) Contemplated programming languages for which the invention may be implemented include BASIC, COBOL, FORTRAN, C, C++, C#, JAVA, J#, VISUAL BASIC, REAL BASIC, DELPHI, ASP, PASCAL, HTML, XML, ADA, PERL, DYLAN, PYTHON, SMALLTALK, TCL-TK, EIFFEL and any other programming languages.

At step 708, the feasibility of inserting the code segment into the source code is determined. For example, in the MICROSOFT VISUAL BASIC language, a property cannot be placed into a method, hence in step 708, in one embodiment of the invention, insertion of a property code segment into a method would not be allowed. Likewise, if lines of code are not encapsulated into a method, in one embodiment of the invention, the lines of code would not be able to be inserted into a namespace or module, because lines of code must be contained within a procedure such as a subroutine, property, or function. In one embodiment of the invention, a code segment comprising a function may not be inserted inside another function. In one embodiment of the invention, a class, structure, or interface definition may not be inserted within a method. The above listed and other insertion rules may apply to many programming languages including C#, and many other languages, such as the ones listed above.

Figure 8:
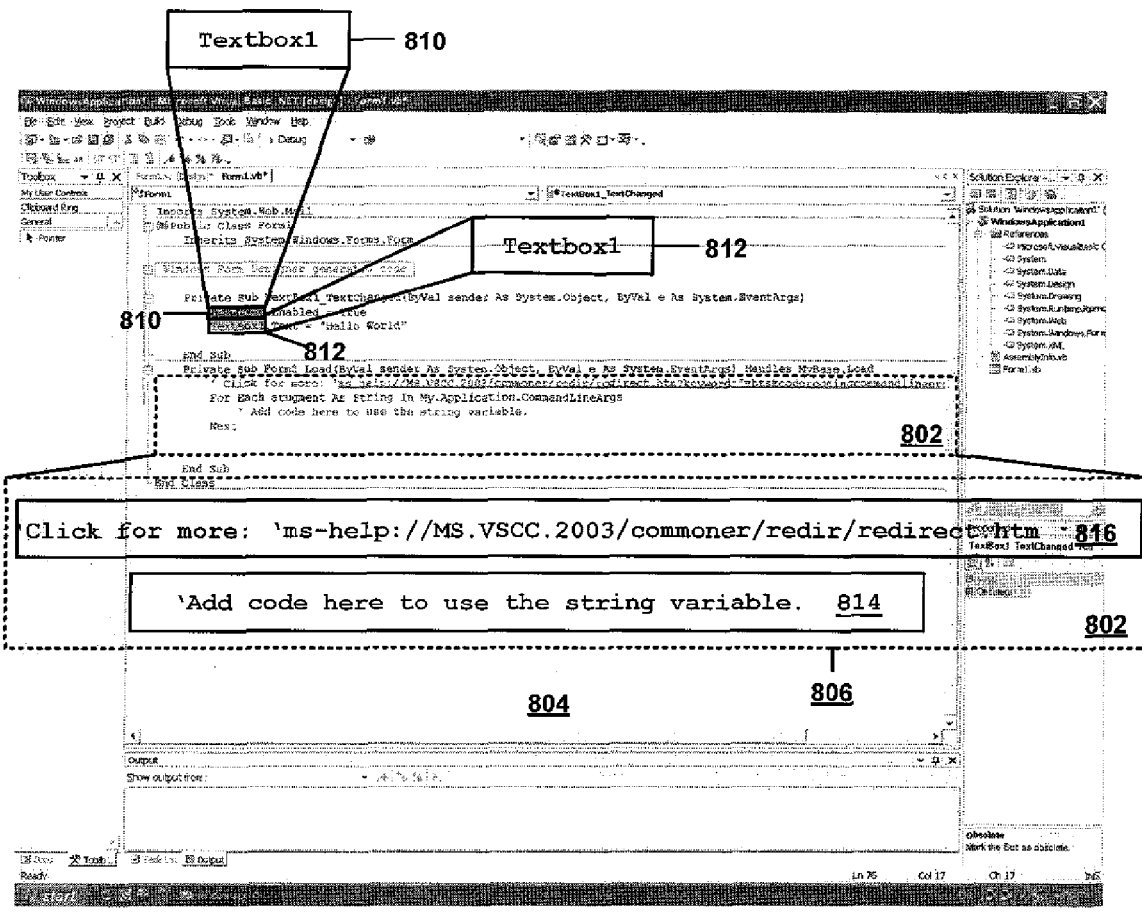
FIG. 8 is an exemplary screen shot of a user interface that may be displayed when inserting a code segment into a source program in accordance with one aspect of the invention.

At step 710, the code segment is copied into the source code at the position indicated (e.g., the position may be determined, for example, by the location of the cursor when the code segment is selected.) FIG. 8 illustrates an exemplary screen shot of one embodiment of the invention, in which code segment 802 delimited by boundary 806 has been inserted into source code 804. One or more comments, as illustrated by comments 814 and 816 may be displayed. Comments may provide information helpful in modifying the code segment for its new environment (e.g., comment 814) or may include a link to a help topic (e.g., comment 816) or other suitable information, and may represent comment information entered by the code segment originator when the code segment was generated, as discussed above.

At step 712, each element that may require modification such as but not limited to fields such as but not limited to literals, controls and objects within the code segment is identified (e.g., by comparing meta information in the XML file delimited with appropriate tags and the identified control, literal, object as found in the code part of the code segment). The identified literals, controls and objects and the like are highlighted or otherwise distinguished in the source code, as illustrated in FIG. 8 by controls 810 and 812.

Figure 12:
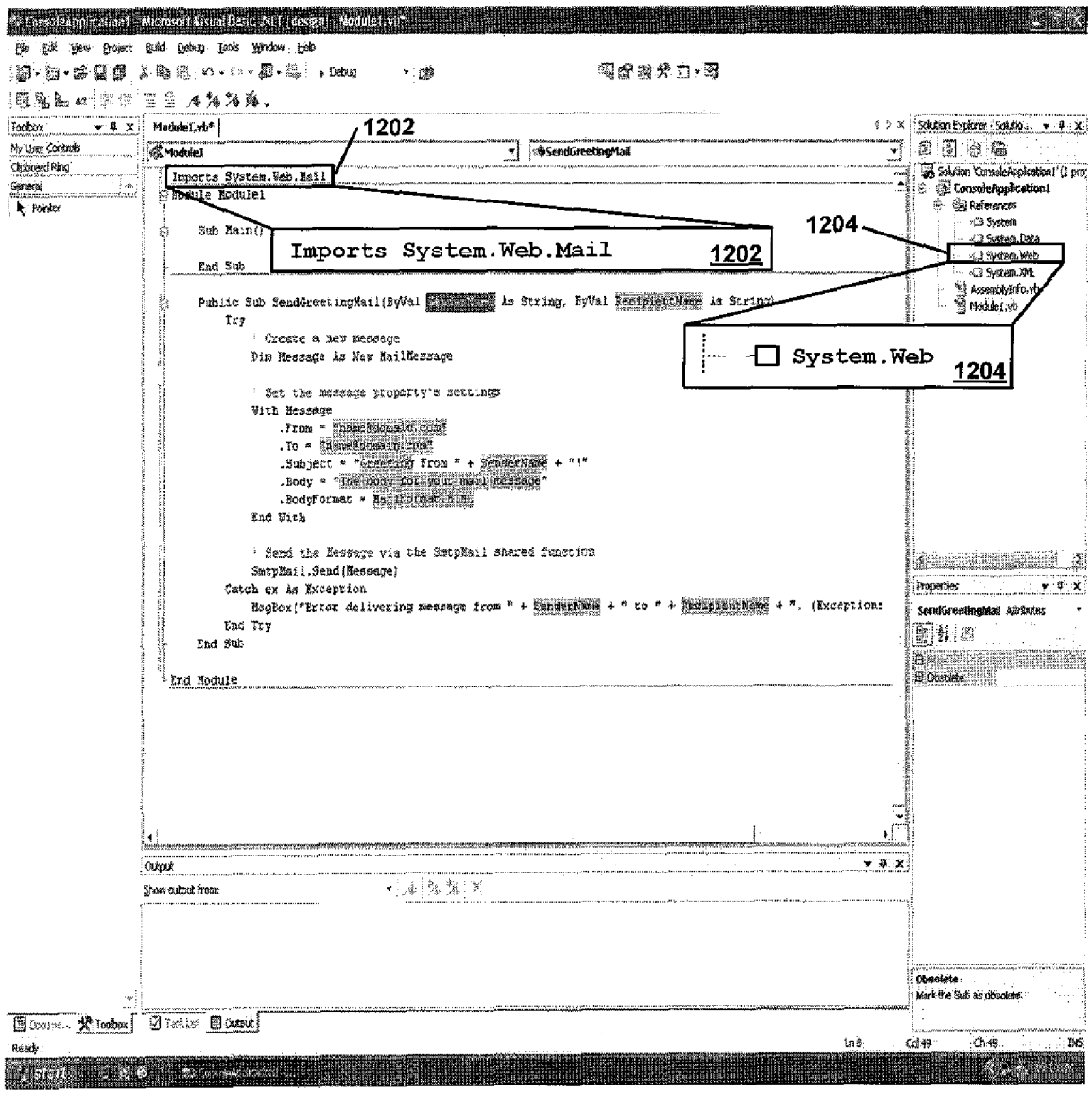
FIG. 12 is an exemplary screen shot of a user interface that may be displayed in accordance with one aspect of the invention.

At step 714, the imports and references representing libraries, components and other programming elements required for the code segment to run are examined in the encoded code segment file and those imports and references not already contained in the source code are inserted into the source code (e.g., the import statement 1202 of FIG. 12 has been inserted, and the list of references has been updated to include "System.Web" 1204).

At step 716 the focus represent by a carat or cursor and highlighting is moved to the first element that may require modification (e.g., TextBox 1 810). At step 718 the marker is activated. In one embodiment activation is indicated by displaying a border around the element having focus.

In one embodiment of the invention, the act of changing one literal, variable or control results in the automatic updating of all other instances of that literal, variable or control within the same code segment. For example, as shown in FIG. 8, suppose "TextBox1" 810 is changed to "TextBox2". In one embodiment of the invention, upon changing "TextBox1" 810 to "TextBox2", "TextBox1" 812 is similarly automatically changed to "TextBox2".

Figure 10:
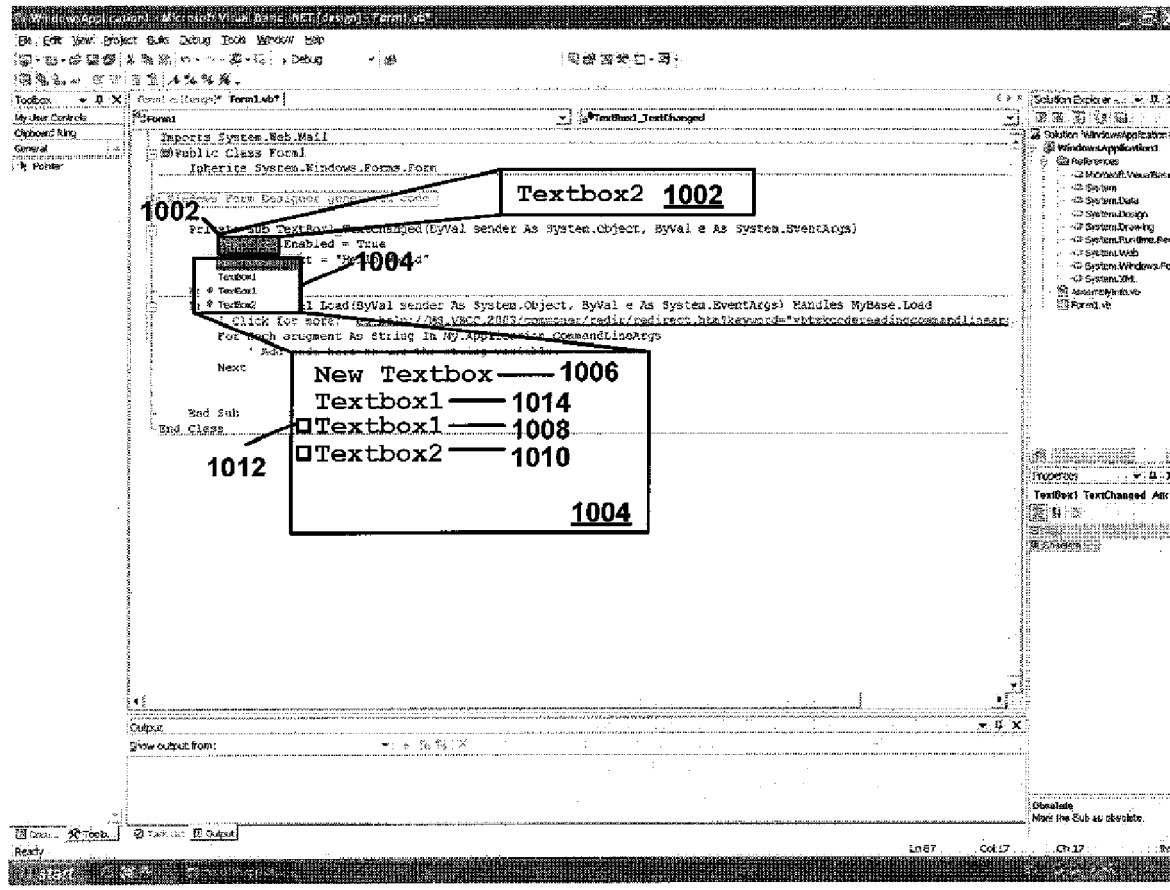
FIG. 10 is an exemplary screen shot of a user interface that may be displayed when selecting an element for modification in accordance with one aspect of the invention.
Figure 11:
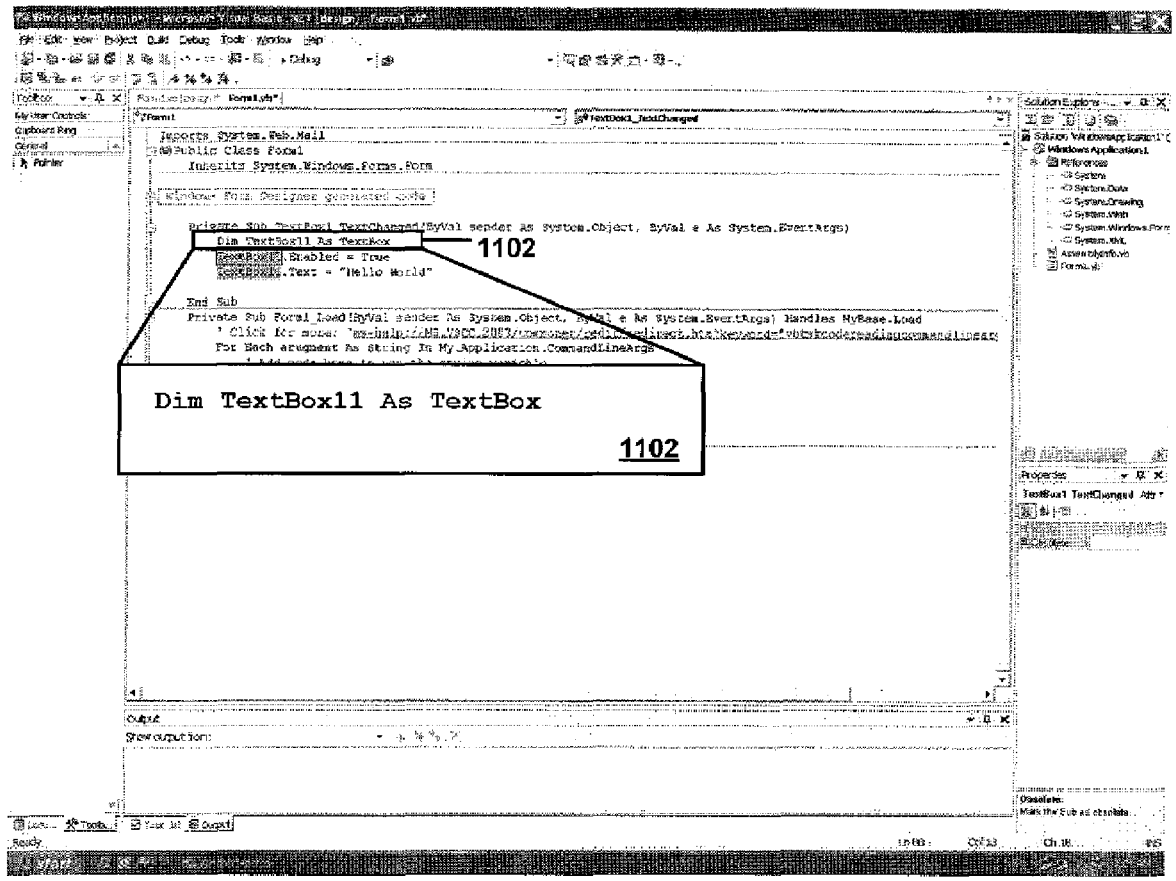
FIG. 11 is an exemplary screen shot of a user interface that may be displayed when a new instance of an element is selected for insertion.

In one embodiment of the invention, upon receiving a specified user action or event (such as, for example, but not limited to: entering CONTROL+SPACE), a list of valid substitutions for the variable are displayed. In one embodiment of the invention, the items included in the list box 1004 include the default element and any analogous elements that appear within the source code. For example, referring now to FIG. 10, if upon selecting "TextBox2" 1002, CONTROL-SPACE is entered, a list box 1004 including the elements TextBox1 1014 (a default), and any TextBox variables that exist on the form (e.g., TextBox 1 1008 accompanied by an icon or indicator 1012 that indicates that this is an element from the source code, and TextBox2 1010). One of the items in the list may provide an option to declare another instance of the selected element. For example, in FIG. 10, NewTextBox 1006 is such an element. Selection of New TextBox 1006 may result in the declaration of a new instance of the TextBox variable, as shown in FIG. 11 line 1102. In the example shown, "TextBox1" 1014 is the default value specified by the code segment originator for this element. In one embodiment of the invention, a number is automatically appended to the default value to create a unique name. If another new element is declared, the name of the new instance may be incremented again (e.g., generating the unique id "TextBox12", for instance.

In one embodiment of the invention, the boundaries 806 of the code segment 802 are retained. Pressing the tab key will move activation to the next marked field for potential modification. After the last marked field has been reached, pressing tab again in one embodiment of the invention move activations to the first field of the code segment. In one embodiment of the invention, an undo option enables the user to return the code segment to its original state (i.e., as it was originally inserted into the source code after the code segment was selected for re-use).

Figure 9:
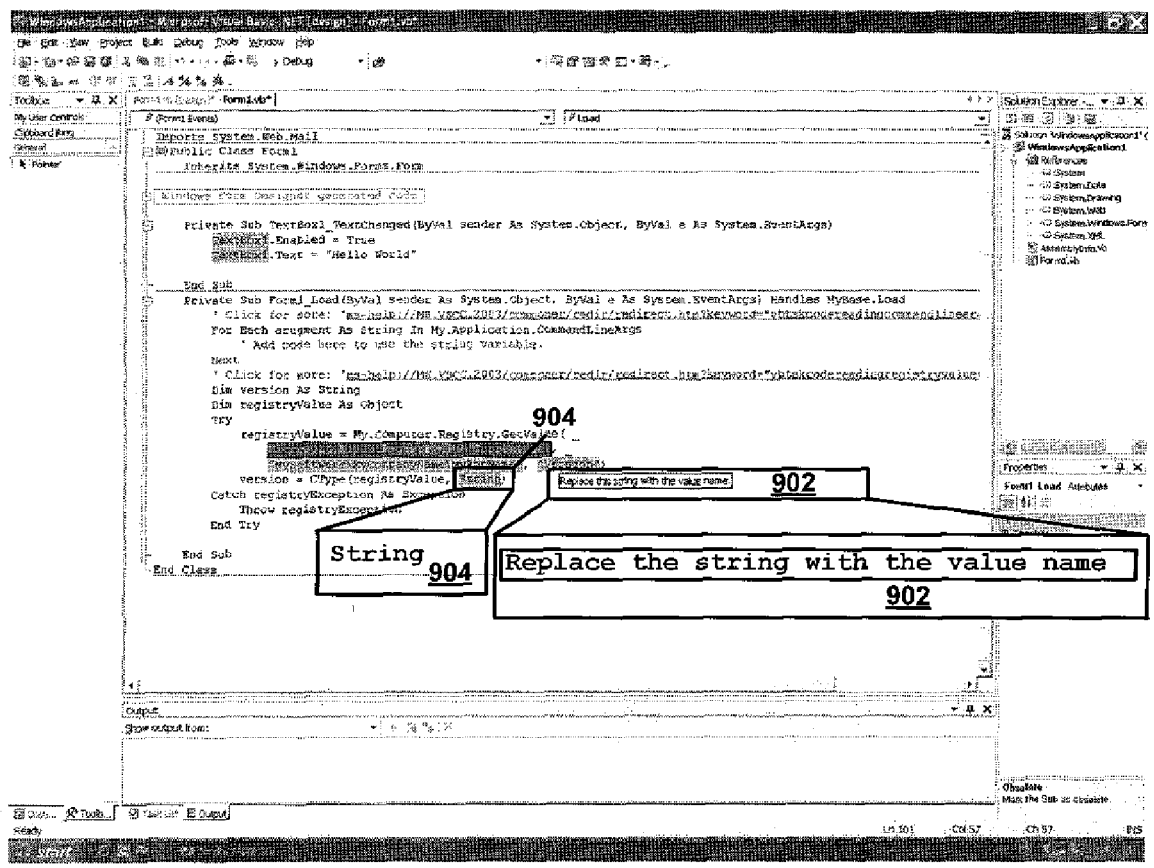
FIG. 9 is an exemplary screen shot of a user interface that may be displayed when inserting a code segment into a source program in accordance with one aspect of the invention.

FIG. 9 illustrates a tip that may be displayed in accordance with an aspect of the invention. Tip 902 may be displayed when an element 904 with which the tip is associated is selected. In one embodiment of the invention, a tip is displayed by hovering the cursor over a field with which is associated a tip.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A computerized method of creating and re-using re-usable code segments, comprising:

in a graphical program editor user interface, receiving a selection of a fragment of existing source code in one of a plurality of programming languages for re-use, the fragment comprising a code segment;

in the graphical program editor user interface, receiving a selection of information for association with the code segment, the associated information comprising keywords for finding the code segment when the code segment is to be re-used, a database schema for a data source with which the code segment interacts, and help text for providing assistance upon reuse of the code segment, the help text adapted to be displayed as a tip when the code segment is selected for re-use and readable by a human;

converting the code segment and associated information into an XML file comprising the code segment and the associated information, the XML file tagged with XML tags;

storing the XML file in a library of augmented re-usable code segments, wherein the library of augmented re-usable code segments comprises a source of re-usable code segments for inclusion in one or more source programs;

in an instance of the graphical program editor, providing access to the library of augmented re-usable code segments;

receiving in the graphical program editor a selection of a code segment stored in the library of re-usable code segments;

parsing the XML file associated with the selected code segment to identify associated information;

in the graphical user interface, displaying from the associated information in the library at least one tip for re-using the selected code segment, the tip comprising help text for modifying the selected code segment in order to operate in a program;

in the graphical user interface, receiving a user input selecting a location within a source program to insert the selected code segment;

comparing information associated with the selected code segment in the library with the source code program and determining whether the selected code segment external from the source program complies with program construction rules of the source program;

inserting the selected code in the source program at a location indicated by a cursor when it is determined that the selected code segment complies with program construction rules of the source program; and prohibiting the selected code segment from being inserted when it is determined that the selected code segment does not comply with program construction rules of the source program.

2. The method of claim 1, wherein converting the code segment comprises including the code segment and the associated information in the XML file.

3. The method of claim 1, wherein the associated information comprises an author.

4. The method of claim 1, the associated information comprises a programming language in which the code segment is written.

5. The method of claim 1, wherein the associated information comprises a tip associated with an element of the selected code.

6. The method of claim 1, wherein the associated information comprises including a comment associated with an element of the selected code.

7. The method of claim 1, wherein the associated information comprises at least one reference required for the code segment to run.

8. The method of claim 1, wherein the associated information comprises a version of execution environment with which the code segment is expected to run.

9. The method of claim 1, further comprising parsing the XML file to determine information associated with the code segment stored in the code segment library selected for re-use in a source program.

10. The method of claim 9, further comprising in response to determining that a programming language in which the code segment is coded matches the coding language of the source program, inserting the code segment into the source program.

11. The method of claim 1, wherein the code segment inserted into the source program comprises a reference.

12. The method of claim 11, wherein the reference comprises a declaration of an object.

13. The method of claim 11, wherein the reference comprises an element, the element determined by an external description of the element associated with the code segment.

14. The method of claim 11, wherein the reference comprises a declaration of a literal.

15. The method of claim 11, wherein the reference comprises a declaration of a control.

16. The method of claim 1, wherein the code segment inserted into the source program comprises an element required for execution of the code segment.

17. The method of claim 16, wherein the element comprises a library required by the code segment for execution.

18. The method of claim 16, wherein the element is only inserted into the source program if the element is not already present in the source program.

19. The method of claim 1, further comprising determining elements of the code segment that may require modification in the source program by comparing information associated with the element with code in the XML file.

20. The method of claim 19, wherein at least one element that may require modification in the source program is distinguished from other portions of the code segment inserted into the source program.

21. The method of claim 20, wherein a tip associated with the distinguished element in the code segment is displayed.

22. The method of claim 20, wherein the at least one element having focus is distinguished by a border surrounding the element.

23. A computer-implemented system for creating code segments for re-use, the system comprising:

a processor adapted to execute computer-executable instructions;

memory communicatively coupled with said processor, said memory comprising computer executable instructions executable on said processor, said instructions comprising:

computer-executable instructions for receiving a selection n a in a graphical program editor user interface of a fragment of existing source code in one of a plurality of programming languages for re-use, the fragment comprising a code segment;

computer-executable instructions for receiving in a graphical user interface, a selection of information for association with the code segment, the associated information comprising keywords for finding the code segment when the code segment is to be re-used, a database schema for a data source with which the code segment interacts, and help text for providing assistance upon reuse of the code segment, the help text adapted to be displayed as a tip when the code segment is selected for re-use and readable by a human;

computer-executable instructions for converting a code segment and information associated with the code segment into an XML file for storing in a code segment library, computer-executable instructions for storing re-usable code segments in the code segment library for inclusion in the source program, computer-executable instructions for providing access in an instance of the graphical program editor to the library of augmented re-usable code segments;

computer-executable instructions for receiving in the graphical program editor a selection of a code segment stored in the library of re-usable code segments;

computer-executable instructions for parsing the XML file associated with the selected code segment to identify associated information;

computer-executable instructions for displaying from the from the associated information in the library at least one tip for re-using the selected code segment, the tip comprising help text for modifying the selected code segment;

computer-executable instructions for receiving in the graphical user interface a user input selecting a location within a source program to insert the selected code segment;

computer-executable instructions for comparing information associated with the selected code segment with the source code program and determining whether the selected code segment external from the source program complies with program construction rules of the source program; and computer-executable instructions for inserting the selected code in the source program at a location indicated by a cursor when it is determined that the selected code segment complies with program construction rules of the source program; and computer-executable instructions for prohibiting the selected code segment from being inserted when it is determined that the selected code segment does not comply with program construction rules of the source program.

24. The system of claim 23, wherein converting the code segment into the XML file comprises identifying at least one type of meta information associated with the code segment and storing the at least one type of meta information in the XML file tagged with an indicator indicating the type of the meta information.

25. The system of claim 24, wherein the type of meta information comprises code.

26. The system of claim 24, wherein the type of meta information comprises a reference.

27. The system of claim 24, wherein the type of meta information comprises a library for importing, the library required by the code segment for execution.

28. A computer-readable storage medium comprising computer-executable instructions for:

in a graphical program editor user interface, receiving a selection of a fragment of existing source code for re-use, the fragment comprising a code segment, in the graphical program editor user interface, receiving a selection of information for association with the code segment, the associated information comprising keywords for finding the code segment when the code segment is to be re-used, a database schema for a data source with which the code segment interacts, and help text for providing assistance upon reuse of the code segment, the help text adapted to be displayed as a tip when the code segment is selected for re-use and readable by a human;

converting the code segment and associated information into an XML file comprising the code segment and the associated information, the XML file tagged with XML tags; and storing the XML file in the library of code segments, wherein the library of code segments may be used as a source of re-usable code segments for inclusion in a source program, in an instance of the graphical program editor, providing access to the library of augmented re-usable code segments;

in an instance of a graphical program editor, receiving a selection of a code segment stored in the library of reusable code segments, parsing the XML file associated with the selected code segment to identify associated information;

in the graphical user interface, displaying from the associated information in the library at least one tip for re-using the selected code segment, the tip comprising help text for modifying the selected code segment, comparing information associated with the selected code segment in the library with the source code program and determining whether the selected code segment external from the source program complies with program construction rules of the source program;

inserting the selected code segment in the source program at a location indicated by a cursor when it is determined that the selected code segment complies with program construction rules of a the source program, and prohibiting the selected code segment from being inserted when it is determined that the selected code segment does not comply with program construction rules of the source program.

* * * * *